United States Patent [19]

Pell

[11] 3,760,298
[45] Sept. 18, 1973

[54] CIRCUIT FOR SUPPRESSING LEAKAGE CURRENTS FLOWING INTO AN UNDERGROUND CABLE SHEATH

[75] Inventor: Robert H. Pell, Andover, N.J.

[73] Assignee: The United States of America as represented by the Secretary of the Navy, Washington, D.C.

[22] Filed: July 5, 1972

[21] Appl. No.: 269,002

[52] U.S. Cl.............. 333/12, 333/17, 179/78, 317/10
[51] Int. Cl. .............................................. H04b 3/28
[58] Field of Search ............... 333/12, 17; 179/78, 179/79, 80; 317/10

[56] References Cited
UNITED STATES PATENTS

| | | | |
|---|---|---|---|
| 3,705,365 | 12/1972 | Sarkozi | 333/12 |
| 2,105,305 | 1/1938 | White | 179/78 R |
| 2,282,319 | 5/1942 | Brown | 333/12 |
| 2,222,953 | 11/1940 | Normann | 179/78 R |
| 3,235,856 | 2/1966 | Gilchrist | 317/10 X |
| 3,518,577 | 6/1970 | Baum | 333/12 |

Primary Examiner—Rudolph V. Rolinec
Assistant Examiner—Saxfield Chatmon, Jr.
Attorney—R. S. Sciascia et al.

[57] ABSTRACT

A circuit for suppressing leakage currents flowing into an underground or underwater cable sheath for a cable carrying low-level signals into or out of a receiver or transmitter system having a current sensing means associated with a conductor means connecting the system ground to the cable sheath to detect leakage current used to generate a voltage in a coupling means between the system ground and earth ground to bypass the leakage currents through the coupling means minimizing leakage current interference with the low-level signals.

3 Claims, 1 Drawing Figure

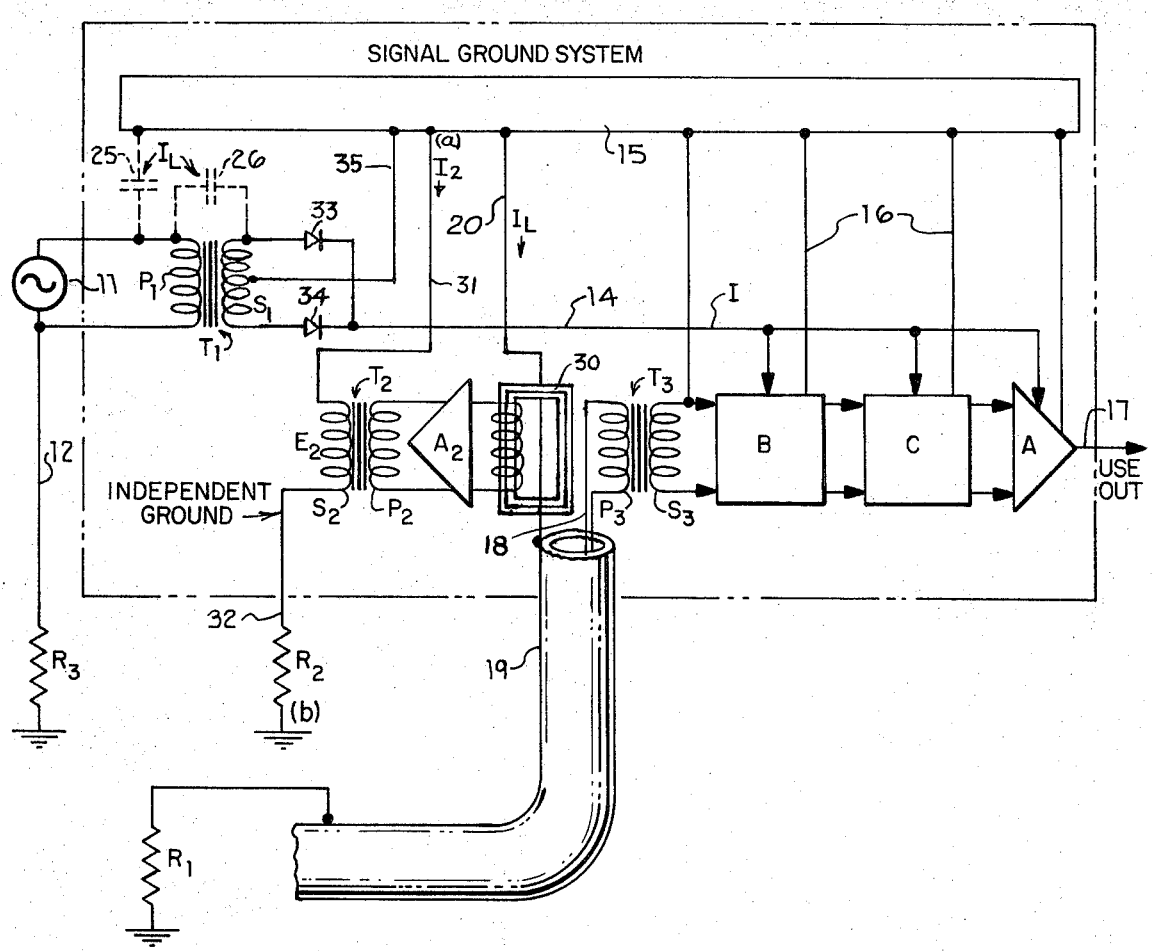

CIRCUIT FOR SUPPRESSING LEAKAGE CURRENTS FLOWING INTO AN UNDERGROUND CABLE SHEATH

BACKGROUND OF THE INVENTION

This invention relates to the suppression of leakage currents in low-level signal transmitting cable sheath generated from transmitting or receiving power supply sources and more particularly to the detection and the bypassing of these leakage currents around the cable sheath leakage current path to eliminate or minimize the interference of these leakage currents with the low-level signals being transmitted by the sheathed conductors.

Transmitting or receiving equipment of low-level signals via sheathed underground or underwater cable means generally are operated on direct current (D. C.), such DC being obtained from rectifiers which in turn are operated from alternating current from remote generators. Although the DC producing rectifiers are metallically isolated from the alternating current sources by transformers, unavoidable capacitive leakage paths will exist between the primary and secondary of such transformers. Since it is customary to connect either the positive or negative side of the direct current source to the signal ground system, and in turn to connect the signal ground system to the cable sheath or armor, power frequency currents will flow across the capacitive leakage paths into the signal ground system and will return to the remote generator ground, which is earth ground, via the underground or underwater cable sheath or armor. Such currents along the cable sheath may induce undesirable power frequency components in the low-level signal circuits of the cable even though such circuits are nominally balanced.

SUMMARY OF THE INVENTION

In the present invention, where there is a transmitting or receiving system of low-level signals over a sheathed or armored underground or underwater cable, a current sensing means, such as a current transformer, is used in combination with the connection of the system ground and the cable sheath to pickup or sample these leakage currents. These leakage currents develop a voltage which is amplified and applied to a coupling means, such as a transformer, the secondary of which is coupled between the system ground and earth ground, providing a bypass for these leakage currents. The secondary is an impedance to AC currents which is reduced or overcome by an amount proportional to the voltage developed by the leakage current. As leakage currents to the cable sheath tend to increase the voltage developed thereby is increased to increase the current through the bypass circuit which in effect decreases the impedance in the transformer secondary to bypass the leakage current to earth ground, minimizing or suppressing leakage current through the cable sheath. If the phase relation of the leakage current and voltage developed thereby is properly adjusted, the result is a negative feedback arrangement which tends to reduce the impedance between the system ground and earth ground. It is accordingly a general object of this invention to provide a circuit for suppressing the leakage currents flowing into an underground or underwater cable sheath or armor of a low-level signal system to eliminate or minimize interference of these leakage currents with the low-level signals conducted by the cable.

BRIEF DESCRIPTION OF THE DRAWING

These and other objects and the attendant advantages, features and uses will become more clear to those skilled in the art as a more detailed description proceeds when considered along with the accompanying drawing illustrated in block and circuit schematic environment incorporating the invention.

DESCRIPTION OF THE PREFERRED EMBODIMENT

Referring more particularly to the drawing there is illustrated a receiver system of low-level signals within a dot and dashed lined enclosure. For the purpose of example let it be assumed that the device is a receiver requiring direct current for its operation, such direct current being obtained from one or more direct current power supplies, represented in the drawing by transformer T1 in association with rectifiers 33 and 34. Conductor 14 distributes the direct current to the processing components A, B, and C each of which is grounded to the signal ground system 15 by conductor 16. The other terminal of the direct current power supply is connected to the signal ground system by conductor 35. The output from the receiver complex is taken over the output conductor 17 and the input is by way of the low-level signal conductors 18 to the primary $P_3$ of an input coupling transformer $T_3$ having its secondary $S_3$ coupled to the receiver complex B of which A, B, and C are shown coupled in series to represent receiving components ordinarily and generally in use, as well understood by those skilled in the art. The low-level signal input conductors 18 are within a sheath or armor 19 which couples a remote signaling station by underground or underwater means and the impedance of this sheath to earth is represented in this FIGURE of drawing by $R_1$. It is general practice in the art to always directly connect the sheath or armor of the underground or underwater cable to the signal ground system which is illustrated in the drawing by the conductor 20.

As hereinabove stated leakage currents get into the cable sheath or armor by way of the signal ground system because of unavoidable capacitive leakage paths illustrated in dotted lines by capacitors 25 and 26 as illustrated in the drawing. These leakage currents circulate through these capacitive leakage paths 25 and 26 to the signal ground system 15 and via the conductor 20 to the sheath or armor 19 to earth ground and back through earth to the conductor 12 of the remote generator 11. Such leakage currents are developed as voltage $E_L$ to produce the leakage currents $I_L$ over the path hereinabove stated which interfers with the low-level signals transmitted or conducted by way of the conductors 18.

In the present invention these leakage currents are greatly suppressed by bypassing these currents over another circuit by way of an independent ground to earth. By this invention any current sensing means may be used but is illustrated herein as an induction coil 30 surrounding the conductor 20 to sense or pickup the leakage currents. Induction coil 30 is coupled through an amplifier $A_2$ through the primary $P_2$ of a transformer $T_2$, the secondary $S_2$ of which is connected by way of conductor 31 to the signal ground system 15 and by way of conductor 32 to the independent ground to earth with an impedance represented by $R_2$. The current $I_L$ tending to flow into the cable sheath or armor 19 is sensed and smplified in $A_2$ producing a current in $P_2$ which is induced in the secondary $S_2$ to produce a voltage $E_2$ such that $$E_2 = I_L Z$$

where $I_L$ is the sheath current and $Z$ represents the transfer impedance of the induction coil/amplifier/transformer combination. If the phase relation of the voltage $E_2$ is maintained so that $I_2$ is in phase with $I_L$, the impedance between points A and B will be reduced proportionally and inversely to the generation of $E_2$, thus tending to bypass the leakage currents in the form of $I_2$ from the signal ground system 15 to earth ground at (b). The amplifier $A_2$ may include a phase adjustment or a separate phase shifter may be used, as well understood by those skilled in the art.

Without suppression all the leakage current will flow to the cable sheath or armor 19 by way of conductor 20. With the system of the current pickup coil 30 and the circuit from the signal ground system 15 by way of conductors 31 and 32 through the secondary $S_2$, the $I_L$ or leakage currents will be suppressed or minimized by bypassing the leakage currents as $I_2$ directly to ground in accordance with a reduction factor K in which $$K = R'/(1 + ZR'')$$

wherein $$Z = E_2/I_L$$
$$R' = (R_1 R_2 + R_2 Z_3)/(R_p)$$
$$R'' = Z_3/R_p$$
$$R_p = R_1 R_2 + R_1 Z_3 + R_2 Z_3,$$

and wherein $Z_3$ represents the total effective impedance in that portion of the leakage path loop between earth ground at the remote generator, through the generator and through the leakage paths to the signal ground system; $R_2$ is the independent ground to earth impedance, and $R_1$ is the cable sheath or armor to earth ground impedance.

It will be seen by those skilled in the art that the degree of suppression of leakage currents will be dependent on the gain of amplifier $A_2$.

OPERATION

In the operation of the device let it be assumed that low-level signals are being received by way of the conductor means 18 through the cable having a cable sheath or armor 19 from some remote station in which the cable is buried in the earth or laid underwater to this receiving station. The low-level signals coming by way of 18 are transformer coupled to the receiving equipment and processed in the receiver complex A, B, and C to prepare these signals for use on the output 17, as well understood by those skilled in the art. The external source of current and voltage supplied by a remote generator 11 of a power system is converted to direct current by means of transformer $T_1$ and suitable rectifiers. Unavoidable capacitive leakage paths between the primary $P_1$ and the ground system 15, and between $P_1$ and the DC distribution conductor 14, result in leakage currents $I_L$ through the signal ground system 15 and connecting conductor 20 to the cable sheath 19 causing a circulation of currents back through the sheath and earth ground to the ground conductor 12 of the power generator 11. The tendency of these leakage currents to occur by way of conductor 20 generates a current in the pickup coil 30 which is amplified in $A_2$ to produce currents proportional to the leakage current in the primary $P_2$ which is induced in the secondary $S_2$ to generate the voltage $E_2$ across the secondary winding. Increase in $I_L$ results in increase of $E_2$ resulting in a proportional increase in current flow or decrease in the impedance across the secondary $S_2$ causing a greater portion of the currents to flow as $I_2$ between points (a) and (b), and reducing currents $I_L$ tending to flow in 20 to the sheath 19, If the phase relation of $E_2$ is properly maintained with $I_L$, and if the amplification in $A_2$ is made large, substantially all the leakage currents will flow to earth via secondary $S_2$ instead of flowing through conductor 20 into the cable sheath or armor of low-level incoming signal conductor 18. Since the impedances $R_1$, $R_2$, and $Z_3$ can be measured, the reduction factor can be computed. In this manner interference with the low-level transmitted or conducted signals is minimized for improved operation of a transmitting and receiving system.

While many modifications may be brought to mind by the teaching of the above invention as by other known current pickups and bypass couplers, it is to be understood that I desire to be limited in the spirit of my invention only by the scope of the appended claims.

I claim:

1. A circuit for suppressing leakage currents flowing into an underground or underwater cable sheath comprising:
   an electrical complex for handling and processing low-level signals having first input means from an external power source and second input means from a low-level signal source,
   a sheath cable surrounding said second input means,
   a signal grounding system, said first input means being electrically connected to said signal grounding system,
   conductor means connected between said sheath cable and said signal grounding system,
   a coil magnetically coupled to said conductor means whereby leakage current flowing in said first conductor means induces current in said coil, and
   a current to current transducer having an input connected to said coil and having an output circuit coupled between said signal grounding system and a second ground whereby leakage current in said first conductor means developes a current in said output circuit thereby reducing flow of leakage current between said signal grounding system and said sheath cable.

2. A circuit for suppressing leakage currents as set forth in claim 1 wherein
   said current-to-current transducer is a transformer having a primary winding coupled to said coil and having a secondary winding coupled as said output.

3. A circuit for suppressing leakage currents as set forth in claim 2 wherein
   said coupling of said coil and said transformer primary includes an amplifier to amplify said current induced by said leakage currents in said coil.

* * * * *